United States Patent Office 3,491,652
Patented Jan. 27, 1970

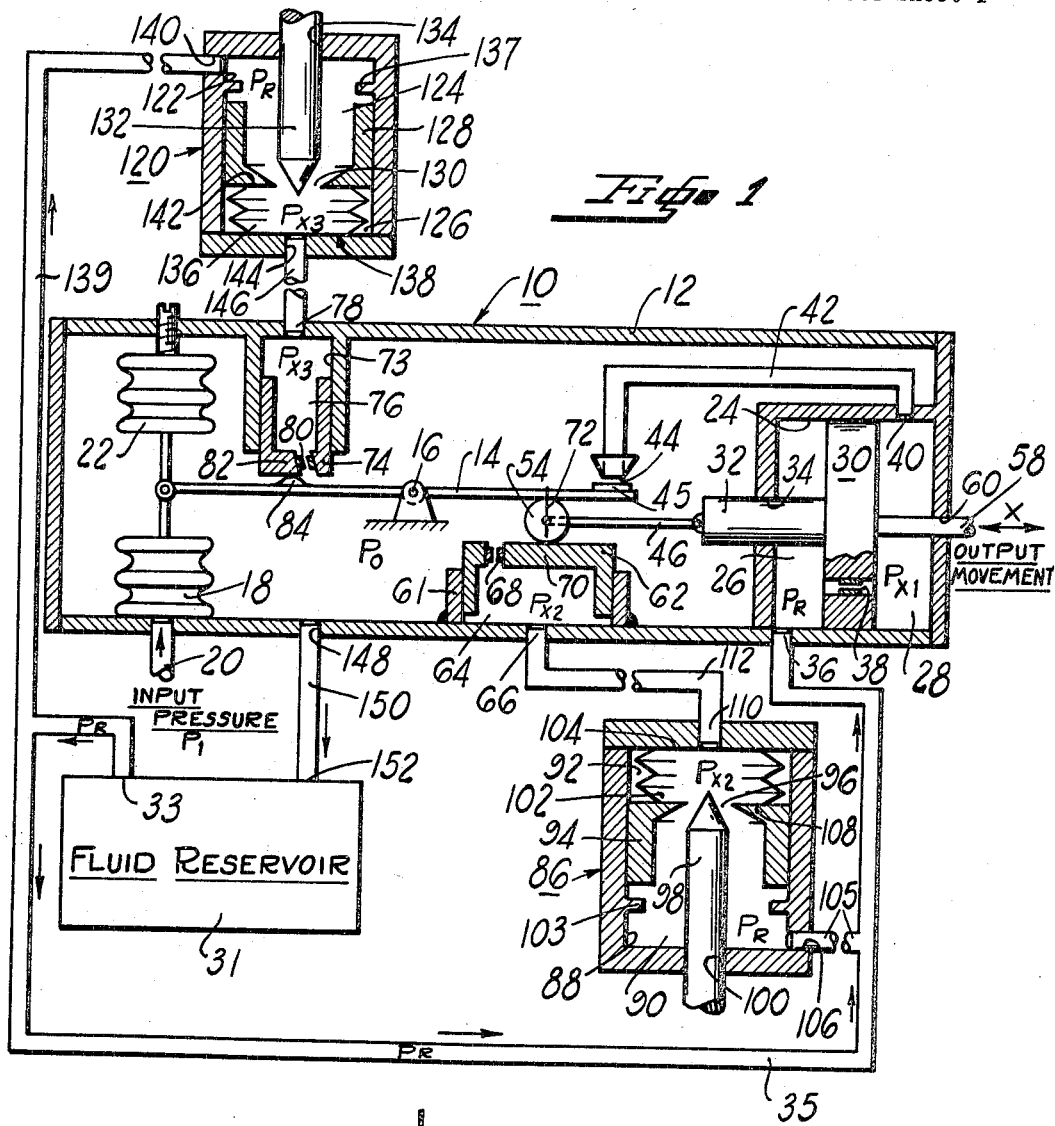

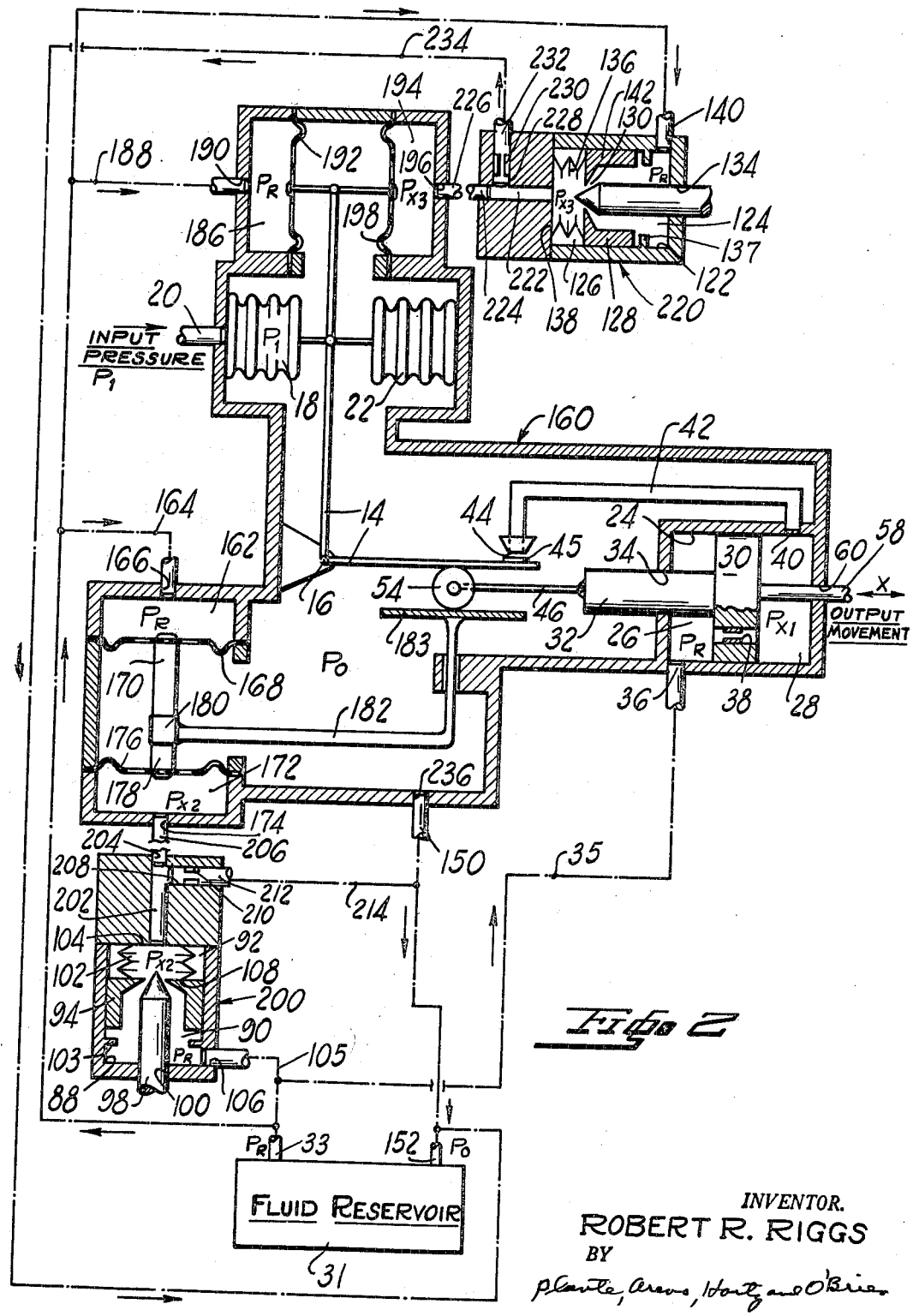

3,491,652
CLOSED LOOP HYDRAULIC SERVOCONTROL APPARATUS
Robert R. Riggs, South Bend, Ind., assignor to The Bendix Corporation, a corporation of Delaware
Filed Feb. 28, 1968, Ser. No. 708,912
Int. Cl. F15b 13/02, 13/16, 9/10
U.S. Cl. 91—47
19 Claims

ABSTRACT OF THE DISCLOSURE

A closed loop hydraulic servomechanism for converting an input pressure into a mechanical output position wherein the mechanical output position is a function of the input pressure. The servomechanism has remote controls to provide trim and slope adjustments.

BACKGROUND OF THE INVENTION

The present invention concerns an improvement to servocontrol mechanisms of the variety generally used with gas turbine engines for effective operation of a plurality of fuel or engine control functions. However, it is felt that the invention may be used for any application where servocontrol is required.

The servomechanisms in extensive use today are typically quite complicated in terms of their designs. This design sophistication requires that adjustable controls, external to the servomechanism housing, be provided to calibrate and align the servo at the time of initial calibration, or upon installation of a control system and engine in an aircraft and further during subsequent maintenance of the aircraft. Although servomechanisms have in some cases provided for the necessary adjustments, they have not been readily externally accessible. Therefore, proper calibration and alignment have not been accomplished, or where it has been accomplished the cost of doing so has been unreasonably high. The usual result has been a degradation of system accuracy due to improper installation or maintenance associated with the lack of accessibility to servomechanism adjustments. Most importantly, this practice has led to inaccurate control systems and thus hazardous aircraft flights.

SUMMARY OF THE INVENTION

It is the purpose of this invention to provide a servocontrol apparatus whose capabilities, size, weight, and external configuration are compatible with current gas turbine engine requirements. The installation and periodic maintenance of this device has been optimized in terms of ease of accessibility to the remotely located trim and slope adjustments to insure, as far as is possible, the accuracy of the control system. Further, safe operation of the aircraft can be accomplished through routine maintenance attainable at a nominal cost which has heretofore not been available.

Other objects and features of the invention will be apparent from the following description of the servocontrol apparatus taken in connection with the accompanying drawings.

BRIEF DESCRIPTION OF THE DRAWINGS

FIGURE 1 is a schematic representation of a hydromechanical servosystem embodying the present invention;
FIGURE 2 is a schematic representation of an alternate embodiment of the servosystem shown in FIGURE 1; and
FIGURE 3 is a graph showing the linear input to output relationship which the servomechanism is capable of performing, including the effect on the relationship of the slope adjustment.

FIGURE 4 is a graph showing the linear input to output relationship which the servomechanism is capable of performing, including the effect on the relationship of the trim adjustment.

DESCRIPTION OF THE PREFERRED EMBODIMENT

Referring to FIGURE 1, the servocontrol apparatus 10 is of the control device variety generally used in association with a gas turbine engine (not shown).

A housing 12 has therein a lever 14 which is pivotally supported by fixed pivot shaft 16. An input force is applied to the left end of the lever 14 by a bellows 18 which has an inlet 20 for receiving a pressurized input signal such as from a variable pressure air source or the like. An evacuated bellows 22 is rigidly secured at one end to the housing 12 and operatively attached at its other end to the left end of the lever 14 in a force-opposing relationship with said pressurized input signal to provide for said input an absolute pressure reference. Housing 12 has disposed therein a cavity 24 which is separated into variable volume fluid chambers 26 and 28 by piston 30. Said piston 30 has a stem 32 projecting slidingly and sealingly through opening 34 in said cavity 24. Fluid reservoir 31 has a fluid outlet 33 providing a regulated supply pressure $P_R$ through fluid passage 35 to the fluid inlet 36 of housing 12. Chamber 26 receives said regulated supply pressure $P_R$ via fluid inlet 36 and communicates through restriction 38 in piston 30 to chamber 28 thereby developing controlled servopressure $P_{x1}$. Chamber 28 vents fluid pressure $P_{x1}$ through outlet 40 and passage 42 to orifice 44. The right end of the lever 14 comprises a flapper valve 45 which operatively engages the orifice 44 so as to control the fluid flow therefrom, and thus, the fluid pressure $P_{x1}$. A shaft 46 is pivotally attached on one end to piston stem 32. Shaft 46 is on its other end pivotally attached to a roller 54. As can be seen by those skilled in the art, numerous structural schemes are available with which to connect shaft 46 to roller 54. It is noted that the output to input relationship is linear when a roller 54 is used as the force-transmitting means. If a non-linear output to input relationship is desired, a contoured surface may be used on the wall of piston 62 that engages the roller 54. The stem 32 has rigidly attached thereto output shaft 58 which slidingly and sealingly projects through opening 60 in housing 12 to provide an output mechanical position for a given input pressure.

Housing 12 is provided with an interior wall 61 which slidingly and sealingly receives piston 62 to thereby form fluid chamber 64. Fluid chamber 64 receives controlled servopressure $P_{x2}$ through fluid inlet 66 and vents same through a restriction 68 in wall 70 of piston 62 to a relatively lower reference pressure $P_o$. Said wall 70 operatively engages roller 54 in response to controlled servopressure $P_{x2}$ to exert a force thereagainst and thus to the lever 14 at a point 72.

Housing 12 is further formed with an interior wall 73 which slidingly and sealingly receives piston 74 to thereby form fluid chamber 76. Fluid chamber 76 receives controlled servopressure $P_{x3}$ through fluid inlet 78 and vents same through a restriction 80 in wall 82 of piston 74 to reference pressure $P_o$. Said wall 82 operatively engages a ridge 84 on the lever 14 in response to controlled servopressure $P_{x3}$ to exert a force against the lever 14.

A slope adjustment means 86, remotely located relative to housing 12, has therein a cylindrical cavity 88. Said cavity 88 is separated into variable volume fluid chambers 90 and 92 by orifice member 94 which slidingly and sealingly engages said cavity 88. Said orifice member 94 has an orifice 96 which has disposed therein valve 98. Said valve 98, projects through an opening 100 of cavity 88 to provide for external control of the position of the valve 98 relative to the orifice 96 and thereby accomplish slope adjustment of the input to output relationship. A unitized stack of conventional thermostatic bimetal elements 102 abuts wall 104 of cavity 88.

Fluid reservoir outlet 33 provides regulated fluid pressure $P_r$ to variable volume fluid chamber 90 through fluid passage 105 and fluid inlet 106. Said regulated fluid exerts pressure $P_r$ against orifice member 94 and thereby abuts orifice member wall 108 against said thermostatic bimetal elements 102. Said cavity 88 further has an annular ledge 103 against which orifice member 94 abuts during any period when fluid pressure is not applied to said orifice member 94. The stack of thermostatic bimetal elements 102 will expand upon a fluid temperature increase and contract upon a fluid temperature decrease. Thus, for a fixed setting of the valve 98, the orifice member 94 and orifice 96 will move relative to valve 98 as a function of the temperature of the bimetal elements 102 thereby providing temperature compensation to keep the controlled servo pressure $P_{x2}$ constant. Said variable volume fluid chamber 92 vents controlled servo pressure $P_{x2}$ through outlet 110 and communicates with fluid inlet 66 through fluid passage 112. Of course the length of fluid passage 112 will vary upon the application for which this invention is used.

FIGURE 3 illustrates a typical operating characteristic of the servomechanism wherein the abscissa represents the input force $P_1$ applied to the lever 14 by the bellows 18 and the ordinate represents the output travel X of the shaft 58 corresponding to the input force. The variation between curves 114, 116, and 118 of FIGURE 3 graph may be achieved by varying the slope adjustment means 86. Assuming curve 114 is the normal operating characteristic of the device, if more output travel for a given input force is desired, the valve 98 is further closed relative to orifice 96 and thereby decreases controlled servo pressure $P_{x2}$. However, if less output travel for a given input force is desired, the valve 98 is further opened relative to orifice 96 and thereby increases controlled servo pressure $P_{x2}$. Thus, the slope adjustment means 86 establishes a gain relationship of the input to output.

A trim adjustment means 120, remotely located relative to housing 12, has therein a cylindrical cavity 122. Said cavity 122 is separated into variable volume fluid chambers 124 and 126 by orifice member 128 which slidingly and sealingly engages said cavity 122. Said orifice member 128 has an orifice 130 which has disposed therein a valve 132. Said valve 132 projects through an opening 134 of cavity 122 to provide for external control of the position of the valve 132 relative to the orifice 130 and thereby accomplish trim adjustment of the input to output relationship. A stack unitized of conventional thermostatic bimetal elements 136 abuts wall 138 of cavity 122. Fluid reservoir outlet 33 provides regulated fluid pressure $P_r$ to variable volume fluid chamber 124 through fluid passage 139 and fluid inlet 140. Said regulated fluid exerts pressure $P_r$ against orifice member 128 and thereby abuts orifice member wall 142 against said thermostatic bimetal elements 136. Said cavity 122 further has an annular ledge 137 against which orifice member 128 abuts during any period when fluid pressure is not applied to said orifice member 128. The stack of thermostatic bimetal elements 136 will expand upon a fluid temperature increase and contract upon a fluid temperature decrease. Thus, for a fixed setting of the valve 132 the orifice member 128 and orifice 130 will move relative to valve 132 as a function of the temperature of the bimetal elements 136 thereby providing temperature compensation to keep the controlled servo pressure $P_{x3}$ constant. Said variable volume fluid chamber 126 vents controlled servo pressure $P_{x3}$ through outlet 144 and communicates with fluid inlet 78 through fluid passage 146. Of course the length of fluid passage 146 will vary upon the application for which this invention is used.

FIGURE 4 illustrates a typical operating characteristic of the servomechanism wherein the abscissa represents the input force $P_1$ applied to the lever 14 by the bellows 18 and the ordinate represents the output travel X of the shaft 58 corresponding to the input force. The variation between curves 114, 149 and 151 of FIGURE 4 graph may be achieved by varying the trim adjustment means 120. Assuming curve 114 is the normal operating characteristic of the device; if it is necessary during calibration of the device to shift the starting point of a specific slope to a point above the starting point of curve 114, the valve 132 is further opened relative to orifice 130 and thereby decreases controlled servo pressure $P_{x3}$. However, if it is necessary to shift the starting point of the same specific slope to a point below the starting point of curve 114, the valve 132 is further closed relative to orifice 130 and thereby increases controlled servo pressure $P_{x3}$. Thus, the trim adjustment means 120 establishes a bias adjustment for the gain relationship of the input to output.

The housing 12 vents fluid reference pressure $P_o$ through fluid outlet 148 and fluid passage 150 to the fluid reservoir inlet 152.

MODE OF OPERATION OF THE PREFERRED EMBODIMENT

Assuming the closed loop servomechanism is nulled, the output shaft 58 has a given position for a corresponding input pressure $P_1$ to bellows 18. The trim adjustment means 120 will exert a constant controlled force by means of piston 74 having servo pressure $P_{x3}$ acting thereagainst on ridge 84 of the lever 14. The slope adjustment means 86 will exert a constant controlled force by means of piston 62 having servo pressure $P_{x2}$ acting thereagainst on roller 54 which transmits said force to the lever 14. Evacuated bellows 22 will exhibit an absolute reference pressure opposing the input pressure $P_1$.

Upon an increase in input pressure $P_1$, the bellows 18 will impart a corresponding input force increase to the lever 14. Said lever 14 will pivot about shaft 16 to cause flapper valve 24 to open further orifice 44. Thereupon, pressure $P_{x1}$ will drop and piston 30 will move to the right. Stem 32 will, through rod 46, move roller 54 to the right. Since pressure $P_{x2}$ remains constant the force derived from piston 62 does not change. Moving the roller 54 to the right increases the lever arm associated with pressure $P_{x2}$ acting on the lever 14 through the roller 54 thus causing a corresponding increase in torque load on lever 14. The flapper valve 24 on the end of lever 14 will tend to close relative to the orifice 44 and balance the increase experienced by the input bringing the servomechanism again to a null condition.

It is understood that upon a decrease in input pressure $P_1$, the servocontrol apparatus will perform an identical converse action. As is generally the case, a servocontrol made for use with a gas turbine engine needs calibration and adjustment at the time of installation of the control and engine in an aircraft. This invention provides for adjustment of the input to output gain of the servocontrol apparatus to match the characteristics of the engine by means of the readily accessible remotely located slope adjustment means 86. Said slope adjustment means 86 can employ one of the many techniques known to those skilled in the art for moving the valve 98 with respect to the orifice 96. Further, this invention provides for biasing the gain of the servocontrol apparatus by means of the readily accessible remotely located trim adjustment means 120. Said trim adjustment means 120 can likewise employ one of the many techniques known to those skilled in the art for moving the valve 132 with respect to the orifice 130. It is further noted that these same adjustments can be conveniently made during normal aircraft preventive maintenance to insure continuing accuracy through the useful life of the device.

DESCRIPTION OF THE MODIFIED EMBODIMENT

In the embodiment shown in FIGURE 2, those parts which are identical to corresponding parts of the preferred embodiment, depicted in FIGURE 1, will be given the same identifying numbers.

In the embodiment of FIGURE 2, a multi-chambered housing 160 has a fluid chamber 162, one end of which receives regulated fluid pressure $P_r$ through fluid passage 164 and fluid inlet 166 and whose other end is defined by a diaphragm 168. Said diaphragm 168 has rigidly fixed thereto a rod 170. Said housing 160 further has a fluid chamber 172, one end of which receives controlled servo pressure $P_{x2}$ through fluid inlet 174 and whose other end is defined by a diaphragm 176. Said diaphragm 176 has rigidly fixed thereto a rod 178. Said diaphragms 168 and 176 are arranged in a force-opposing relationship relative to each other and are of the same area. Said rods have operatively disposed therebetween a means 180 rigidly connected to a rod 182 and platform 183 which is operatively connected to roller 54 so as to exert thereagainst a resultant pressure as a function of $P_r$, $P_o$, and $P_{x2}$. The roller 54 will transmit the resultant force derived from diaphragms 168 and 176 to the lever 14.

Said housing 160 has a fluid chamber 186, one end of which receives regulated fluid pressure $P_r$ through fluid passage 188 and fluid inlet 190 and whose other end is defined by a diaphragm 192. Said housing 160 further has a fluid chamber 194, one end of which receives controlled servo pressure $P_{x3}$ through fluid inlet 196 and whose other end is defined by a diaphragm 198. Said diaphragms 192 and 198 are operatively attached to the end of the input side of the lever 14 in a force-opposing relationship relative to each other and are of the same area. Said diaphragms 192 and 198 exert a force against the lever 14 as a function of $P_r$, $P_o$, and $P_{x3}$.

A slope adjustment means 200 may be identical to that shown in FIGURE 1 except that variable volume fluid chamber 92 vents controlled servo pressure $P_{x2}$ through fluid passage 202 and outlet 204 and communicates with fluid inlet 174 through fluid passage 206. A fluid passage 208 with a restriction 210 connects with fluid passage 202 and has a fluid outlet 212 which returns to fluid reference pressure $P_o$ through fluid passage 214.

A trim adjustment means 220 may be identical to that shown in FIGURE 1 except that variable volume fluid chamber 126 vents controlled servo pressure $P_{x3}$ through fluid passage 222 and outlet 224 and communicates with fluid inlet 196 through fluid passage 226. A fluid passage 228 with a restriction 230 connects with fluid passage 222 and has a fluid outlet 232 which returns to fluid reference pressure $P_o$ through fluid passage 234.

The housing 160 vents fluid reference pressure $P_o$ through fluid outlet 236 and fluid passage 150 to the fluid reservoir inlet 152.

All the remaining structure shown in FIGURE 2 is identical to that which has been previously described in the preferred embodiment, and further, the structure performs the same function. Therefore, the actuation and performance of the modified form of servo control apparatus shown in FIGURE 2 is practically identical to the preferred embodiment of FIGURE 1 and needs no further description of operation.

While the specific details have been herein shown and described, the invention is not confined thereto, as other substitutions can be made within the spirit and scope of the invention.

I claim:
1. A servosystem comprising:
 a first housing having a means responsive to a variable input force,
 a means responsive to a variable output force,
 a means for controlling said variable output force responsive means as a function of said variable input force including a lever operatively connected to said variable input force responsive means and said variable output force responsive means,
 a means operatively connected to said lever to provide an absolute reference pressure opposing said variable input force responsive means,
 a first fluid pressure responsive means operatively connected to said lever and having a fluid inlet,
 a first fluid pressure control means remotely located relative to said first housing for providing a controlled pressurized fluid to said first fluid pressure responsive means to thereby enable said first fluid pressure responsive means to exert a corresponding force against said lever,
 a force transmitting means operatively connected to said lever,
 said force transmitting means operatively connected to said output responsive means through a follow-up means,
 a second fluid pressure responsive means operatively connected to said force transmitting means and having a fluid inlet,
 a second fluid pressure control means remotely located relative to said first housing for providing a controlled pressurized fluid to said second fluid pressure responsive means to thereby enable said second fluid pressure responsive means to exert a corresponding force against said force transmitting means, said force transmitting means being moved by said output responsive means through said follow-up means relative to said second fluid pressure responsive means to cause an increase or decrease in the effective lever arm of said lever in response to an increase or decrease, respectively, of said variable input force whereupon said input force is balanced by an equal and opposite force.

2. A servosystem as recited in claim 1, wherein said first and second fluid pressure control means comprise:
 a second and third housing respectively,
 said second and third housings in communication with a regulated fluid supply and including temperature compensated fluid pressure regulating elements therein,
 said second housing communicating a controlled fluid pressure through a passage to said first fluid pressure responsive means to provide a trim adjustment for said input to output relationship,
 said third housing communicating a controlled fluid pressure through a passage to said second fluid pressure responsive means to provide a slope adjustment for said input to output relationship.

3. A servosystem as recited in claim 1, wherein the variable input force responsive means is a bellows operatively attached to one end of said lever.

4. A servosystem as recited in claim 1, wherein the means responsive to a variable output force comprises:
 a piston separating a cavity into first and second variable volume fluid chambers,
 said piston having a shaft attached to one end which passes through said first variable volume fluid chamber and slidingly and sealingly projects through a cavity wall,
 said first variable volume fluid chamber receiving said pressure through a restriction in said piston to said second variable volume fluid chamber,
 said second variable volume fluid chamber venting through a fluid passage to an orifice,
 said orifice operatively engaging said lever on the opposite side of the pivot point from the input so as to form a flapper valve for controlling the fluid pressure of the second variable fluid chamber and thus the position of the piston in response to an input variation.

5. A servo system as recited in claim 1, wherein the means operatively connected to said lever is an evacuated bellows.

6. A servosystem as recited in claim 1, wherein the first fluid pressure responsive means comprises:
a variable volume fluid chamber having disposed therein a piston operatively engaging said lever intermediate said pivot point and said input responsive means, said variable volume fluid chamber having an inlet receiving controlled fluid pressure from a remote source and venting said pressure through a restriction in said piston to a return reference fluid pressure,
said piston applies a pressure to said lever in response to said controlled fluid pressure.

7. A servo system as recited in claim 1, wherein the first fluid pressure control means comprises:
a second housing having a fluid inlet and outlet with an orifice disposed therebetween,
said second housing having a valve to vary the effective flow area of said orifice,
said orifice being movable relative to said housing and said valve in response to temperature responsive means and fluid inlet pressure,
said second housing fluid outlet venting through a passage a pressurized fluid to said first fluid pressure responsive means fluid inlet to enable said first fluid pressure responsive means to exert a corresponding force against said lever thereby providing a trim adjustment for said input to output relationship.

8. A servosystem as recited in claim 1, wherein the first fluid pressure control means comprises:
a second housing having slidingly and sealingly disposed therein an orifice which separates said housing into first and second variable volume fluid chambers,
a valve disposed in said orifice for controlling the effective flow area thereof and having a stem attached thereto projecting slidingly and sealingly through said housing wall,
a thermostatic bimetal element interposed between said orifice and the other wall of said housing to expand or contract with temperature variations thereby moving the orifice relative to the valve to provide temperature compensation,
said first variable volume fluid chamber receiving a regulated fluid supply pressure and venting through said orifice to said second variable volume fluid chamber,
said second variable volume fluid chamber vents a controlled fluid pressure through an outlet in said other wall of said housing through a fluid passage to said inlet to said first fluid pressure responsive means to enable said first fluid pressure responsive means to impart a corresponding force to said lever intermediate its pivot point and said input thereby providing a trim adjustment for said input to output relationship.

9. A servosystem as recited in claim 1, wherein the force transmitting means is a roller operatively connected to and actuated by said follow-up means.

10. A servosystem as recited in claim 1, wherein the follow-up means is a rod pivotally attached to one end to said variable output force responsive means and at its other end pivotally attached to said force transmitting means.

11. A servosystem as recited in claim 1, wherein the second fluid pressure responsive means comprises:
a variable volume fluid chamber having disposed therein a piston operatively engaging said force transmitting means,
said variable volume fluid chamber having an inlet receiving controlled fluid pressure from a remote source and venting said pressure through a restriction in said piston to a return reference pressure internal to said first housing,
said piston applies a force to said force transmitting means in response to said controlled fluid pressure.

12. A servosystem as recited in claim 1, wherein the second fluid pressure control means comprises:
another housing having a fluid inlet and outlet with an orifice disposed therebetween,
said another housing having a valve to vary the effective flow area of said orifice,
said orifice being movable relative to said housing and said valve as a function of a temperature responsive resilient means and a fluid inlet pressure,
said another housing fluid outlet venting through a passage a pressurized fluid to said second fluid pressure responsive means fluid inlet to enable said second fluid pressure responsive means to exert a corresponding force against said force transmitting means thereby providing a slope adjustment for said input to output relationship.

13. A servosystem as recited in claim 1, wherein the second fluid pressure control means comprises:
another housing having slidingly and sealingly disposed therein an orifice which separates said housing into first and second variable volume fluid chambers,
a valve disposed in said orifice for controlling the effective flow area thereof and having a stem attached thereto projecting slidingly and sealingly through said housing wall,
a thermostatic bimetal element interposed between said orifice and the other wall of said housing to expand or contract with temperature variations thereby moving the orifice relative to the valve to provide temperature compensation,
said first variable volume fluid chamber receiving a regulated fluid supply pressure and venting through said orifice to said second variable volume fluid chamber,
said second variable volume fluid chamber vents a controlled fluid pressure through an outlet in said other wall of said housing through a fluid passage to said inet of said second fluid pressure responsive means to enable said second fluid pressure responsive means to impart a corresponding force to said force transmitting means thereby providing a slope adjustment for said input to output relationship.

14. A servosystem as recited in claim 1, wherein the first fluid pressure reponsive means comprises:
a first fluid chamber having a fluid inlet on one end to receive a regulated fluid pressure and disposed in its other end a diaphragm operatively connected to said lever for imparting said regulated fluid pressure thereto,
a second fluid chamber having a fluid inlet on one end to receive a controlled fluid pressure from a remote source and disposed in its other end a diaphragm operatively connected to said lever for imparting said regulated fluid pressure thereto,
a second fluid chamber having a fluid inlet on one end to receive a controlled fluid pressure from a remote source and disposed in its other end a diaphragm operatively connected to said lever in a force-opposing relationship relative to said first fluid chamber with the resulting force output thereof being imposed on said lever.

15. A servosystem as recited in claim 1, wherein the first fluid pressure control means comprises:
a second housing having a fluid inlet and outlet with an orifice disposed therebetween,
a fluid passage containing a restriction connecting intermediate said orifice and said output and venting to a return reference pressure,
said second housing having a valve to vary the effective flow area of said orifice,
said orifice being movable relative to said housing and said valve as a function of a temperature responsive resilient means and fluid inlet pressure,
said second housing fluid outlet venting through a passage a pressurized fluid to said first fluid pressure responsive means fluid inlet to enable said first fluid pressure responsive means to exert a corresponding force against said lever thereby providing a trim adjustment for said input to output relationship.

16. A servosystem as recited in claim 1, wherein the second fluid pressure responsive means comprises:

a first fluid chamber having a fluid inlet on one end to receive a regulated fluid pressure and disposed in its other end a diaphragm operatively engaging a roller for imparting said regulated pressure thereto, said roller having attached thereto a rod which on its other end operatively engages said force transmitting means, a second fluid chamber having a fluid inlet on one end to receive a controlled fluid pressure from a remote source and disposed in its other end a diaphragm operatively engaging said roller in a force-opposing relationship relative to said first fluid chamber with the resulting force thereof being imposed on said roller, said roller through said rod imparting a force to said force transmitting means in response to said controlled fluid pressure.

17. A servosystem as recited in claim 1, wherein the second fluid pressure control means comprises:

another housing having a fluid inlet and outlet with an orifice disposed therebetween, a fluid passage containing a restriction connecting intermediate said orifice and said output and venting to a return reference pressure, said another housing having a valve to vary the effective flow area of said orifice, said orifice being movable relative to said housing and said valve as a function of a temperature responsive resilient means and fluid inlet pressure, said another housing fluid outlet venting through a passage a pressurized fluid to said second fluid pressure responsive means fluid inlet to enable said second fluid pressure responsive means to exert a corresponding force against said force transmitting means thereby providing a slope adjustment for said input to output relationship.

18. A servosystem as recited in claim 1, wherein the first fluid pressure control means comprises:

a second housing having slidingly and sealingly disposed therein an orifice which separates said housing into first and second variable fluid chambers, a valve disposed in said orifice for controlling the effective flow area thereof and having a stem attached thereto projecting slidingly and sealingly through said housing wall, a thermostatic bimetal element interposed between said orifice and the other wall of said housing to expand or contract with temperature variations thereby moving the orifice relative to the valve to provide temperature compensation, said first variable volume fluid chamber receiving a regulated fluid supply pressure and venting through said orifice to said second variable volume fluid chamber, said second variable volume fluid chamber vents a controlled fluid pressure through an outlet in said other wall of said housing through a fluid passage to said inlet of said first fluid pressure responsive means to enable said first fluid pressure responsive means to impart a corresponding force to said lever thereby providing a trim adjustment for said input to output relationship, a fluid passage containing a restriction connecting intermediate said other wall of said housing and said outlet and venting to a return reference pressure.

19. A servosystem as recited in claim 1, wherein the second fluid pressure control means comprises:

another housing having slidingly and sealingly disposed therein an orifice which separates said housing into first and second variable volume fluid chambers, a valve disposed in said orifice for controlling the effective flow area thereof and having a stem attached thereto projecting slidingly and sealingly through said housing wall, a thermostatic bimetal element interposed between said orifice and the other wall of said housing to expand or contract with temperature variations thereby moving the orifice relative to the valve to provide temperature compensation, said first variable volume fluid chamber receiving a regulated fluid supply pressure and venting through said orifice to said second variable volume fluid chamber, said second variable volume fluid chamber vents a controlled fluid pressure through an outlet in said other wall of said housing through a fluid passage to said inet of said second fluid pressure responsive means to enable said second fluid pressure responsive means to impart a corresponding force to said force transmitting means thereby providing a slope adjustment for said input to output relationship, a fluid passage containing a restriction connecting intermediate said other wall of said housing and said outlet and venting to a return reference pressure.

References Cited

UNITED STATES PATENTS

| 2,544,427 | 3/1951 | Ifield et al. | 91—47 |
| 3,045,983 | 7/1962 | Best | 91—382 |
| 3,393,606 | 7/1968 | Magnani et al. | 91—382 |

FOREIGN PATENTS 1,316,193  12/1962  France.

PAUL E. MASLOUSKY, Primary Examiner

U.S. Cl. X.R.

91—367, 382, 416, 417